United States Patent

[11] 3,588,017

[72] Inventor James O'Brien
 Palos Verdes Peninsula, Calif.
[21] Appl. No. 868,719
[22] Filed Oct. 23, 1969
[45] Patented June 28, 1971
[73] Assignee Norris Industries, Inc.
 Los Angeles, Calif.

[54] NAIL BRACKET FOR ELECTRICAL BOXES
 9 Claims, 6 Drawing Figs.
[52] U.S. Cl. .................................................. 248/205,
 220/3.9
[51] Int. Cl. .......................................... H02g 3/08
[50] Field of Search .......................................... 248/216,
 205, 27, 71, 217, 218, (D.B. Digest), 300; 220/3.9,
 3.92, 3.2, 3.3

[56] References Cited
UNITED STATES PATENTS
3,345,029 10/1967 Palmer .......................... 248/216X
FOREIGN PATENTS
662,776 7/1938 Germany ........................ 248/71

Primary Examiner—J. Franklin Foss
Attorney—Huebner and Worrel

ABSTRACT: A metal nail bracket for electrical boxes which embodies a flat plate attached to the bottom of a box with arms extending obliquely outward of a sidewall of the box, the arms being bent at a 90° angle to form wings which continue the outward extension, the wings embodying acute folds at their outer ends, with nail holes slightly misaligned formed through the folds for retaining nails in the folds, the nails when driven into a building structure flattening out the folds and wedging the nail therein.

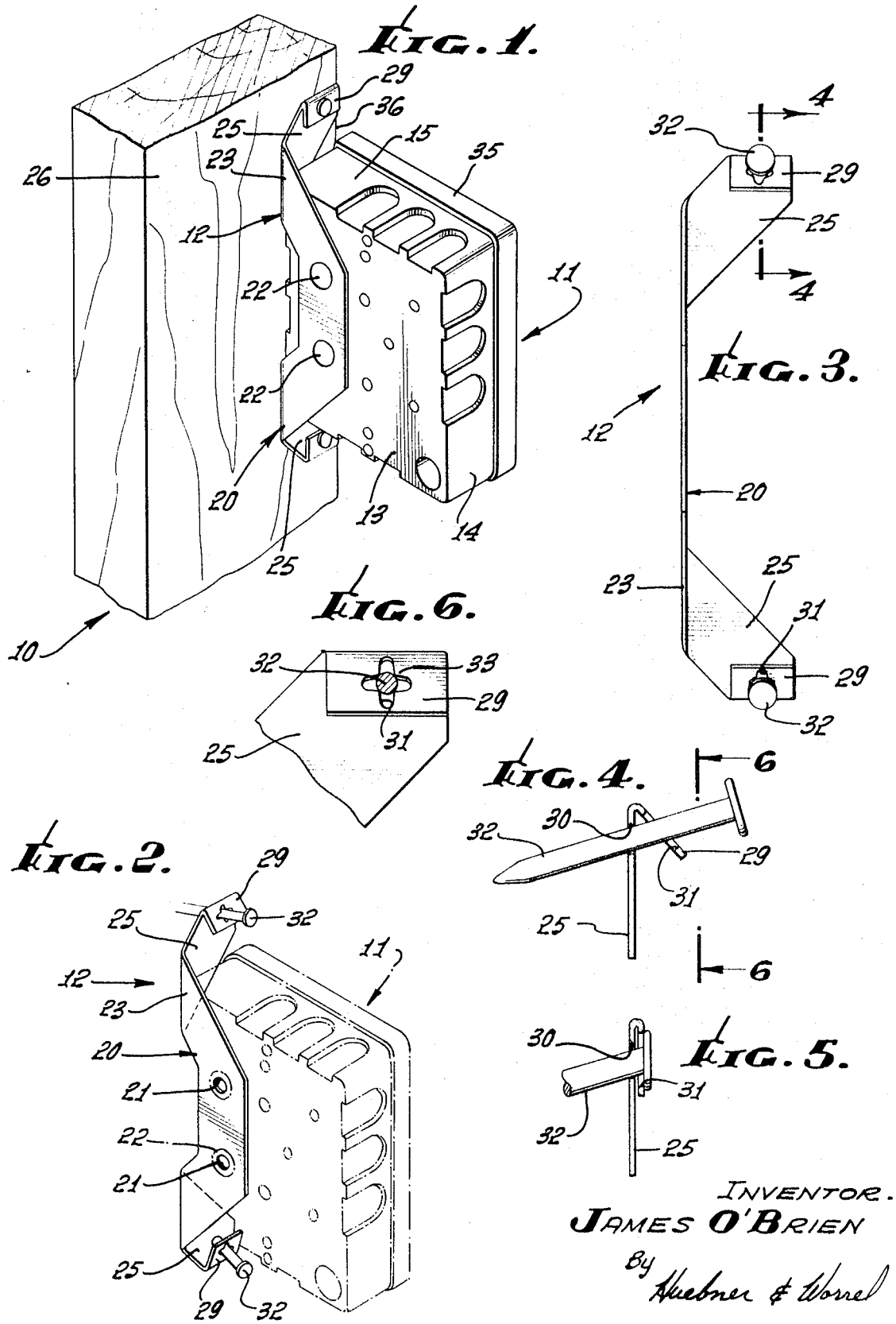

NAIL BRACKET FOR ELECTRICAL BOXES

BACKGROUND OF THE INVENTION

Electrical outlet boxes, junction boxes and switch boxes stamped out of sheet metal, unless attached to hanger bars, conventionally are provided with ears or mounting lugs by which such boxes may be mounted on studding or ceiling beams, or other structural members, by nailing through the ears or lugs. In the case of such boxes molded of plastic or rubber material, nail holes or retainers require special design and construction and tend to increase the cost of production. Moreover, nailing in close proximity to such a box sometimes results in a misdirected hammer blow damaging or destroying the box.

Some forms of metallic brackets attached to molded plastic or rubber boxes have been known to the art. However, the ones with which applicant is familiar have been either functionally deficient or expensive to produce.

SUMMARY OF THE INVENTION

The primary object is to provide an improved nail bracket for mounting electrical outlet boxes, switch boxes, junction boxes and the like to wall studding, ceiling beams or other structural elements. The bracket may be used with sheet metal boxes, but has greater utility in connection with molded plastic or hard rubber boxes. It is inexpensive to produce and offers advantages over prior devices known to applicant.

Preferably the bracket is fabricated of sheet metal and includes a flat base portion which may be riveted or otherwise secured to the bottom of a box. The base portion extends in both directions to opposite sides of the box, and adjacent each side of the box is formed with a flat wing, the plane of which is normal to the plane of the flat base portion. Each wing has a terminal portion comprising a tab folded angularly inward (toward the adjacent sidewall of the box). The angle of the tab is preferably acute to the plane of the wing. By way of example, and not of limitation, an angle of 45° is satisfactory. Nail holes are provided through the tab and wing, aligned for reception of a nail with the axis of the latter extending obliquely toward the opposite nail. A very slight misalignment of the nail holes is preferred so that a slight binding effect is obtained for retaining nails in position during packing and transit.

BRIEF DESCRIPTION OF THE DRAWINGS

FIG. 1 is a perspective view of an outlet box mounted on a building stud by the bracket of this invention.

FIG. 2 is a perspective view of the bracket with the box in phantom, the bracket being ready for use.

FIG. 3 is a vertical end view of the bracket, per se.

FIG. 4 is a fragmentary section taken on the line 4-4 of FIG. 3. This illustrates a nail in position for driving into the stud.

FIG. 5 is a view similar to FIG. 4 but the nail is shown as fully driven in.

FIG. 6 is a fragmentary section taken on line 6-6 of FIG. 4.

DESCRIPTION OF THE PREFERRED EMBODIMENT

FIG. 1, showing the invention in its environment of use, includes a building stud 10 and an electrical outlet box 11 mounted on the stud by nail bracket 12.

The box illustrated is of molded plastic or rubber construction, being by way of example only, and includes a generally rectangular bottom 13, end walls 14, and sidewalls 15.

The nail bracket comprises a flat base portion 20, preferably of truncated outline, provided with rivet holes 21, by which the base is securely fixed by rivets 22 to the bottom of the box.

End sections 23 of the base portion extend to the edges of the box walls 15 and are bent normal to the plane of the base portion forming flat wings 25. These wings lie in a plane parallel to the end walls 14 of the box and consequently parallel to the surface 26 of the stud 10.

Each wing is provided with a tab 29 which is formed by bending back the end of the wing, the angle between the tab and the wing preferably being acute. Holes 30 and 31 are formed in the wing and tab respectively, for reception of a nail 32. The holes are generally aligned but the edge structure of the holes has a sufficiently slight misalignment to frictionally retain the nail in place for packing and delivery to point of use. The hole 30 will usually be annular and the hole 31 may also be annular. However, it is preferable to make hole 31 star-shaped, as illustrated in FIG. 6, whereby small projections 33 engage the surface of the nail. The relief provided by the star-shaped hole also enables a slight shifting of the shank of the nail adjacent the head when the nail is distorted in the final driving. The alignment of the holes in wing and tab preferably provides for a positioning of the nails so that the axes thereof extend obliquely toward each other. This arrangement not only provides a locking action when the nails have been driven in, but also enables hammer blows to be struck at a greater distance to the sides of the box than if the nails were positioned parallel. Being able to strike the hammer blows at a greater distance from the box reduces the possibility of damage to the box by a misdirected blow.

While only one set of holes is illustrated in each wing and tab, it may be advantageous to have two or more sets of holes so that a selection is available.

In use, the assembled box and nail bracket are positioned against the building structure at the location desired. Ordinarily this will be such that a rim 35 which has a width approximately that of the plaster coat to be applied to the walls generally extends outwardly from the adjacent surface 36 of the building stud. The nails which have been prepositioned are driven into the stud. As each nail approaches its final position, it flattens the tab 30 into general parallelism against the wing shown in FIG. 5, and if driven sufficiently hard will distort the nail shank contiguous to the head, with the head lodging approximately flat against the tab.

Although I have herein shown and described my invention in what I have conceived to be the most practical and preferred embodiment, it is recognized that departures may be made therefrom within the scope of my invention.

I claim:

1. A nail bracket for electrical boxes having top, bottom and ends, said bracket comprising a flat base portion adapted for attachment to the bottom of the box, the base portion extending at least as far as diametrically opposite sides of the box, flat wings extending from the base portion normal to the plane thereof in the direction of the box, the base portion and wings forming a cradle to receive the box, the wings having terminal portions each comprising a tab folded angularly inward toward the opposite tab, nail holes in the tab and wing respectively sufficiently aligned for reception of a nail, the junction of tab and wing being adaptable to bending whereby a nail driven through the tab and wing into a building structure can flatten the tab into parallelism with the wing.

2. A nail bracket as defined in claim 1 in which the base portion, wings and tabs comprise an integral structure formed of sheet metal, and the wings and tabs lie within planes defined by the top and bottom of the box.

3. A nail bracket as defined in claim 10 in which the holes in the tab and wing are of such magnitude and slightly misaligned so that the material defining the holes will frictionally engage a nail to retain it in situs preliminary to use.

4. A nail bracket as defined in claim 3 in which the hole in the tab is generally star-shaped providing radially inward projections of material defining such hole which projections will engage the nail.

5. A nail bracket as defined in claim 10 in which the tab is disposed at an acute angle to the plane of the wing.

6. A nail bracket as defined in claim 5 in which the acute angle is approximately 45°.

7. A combination comprising: an electrical box having top, flat bottom, and sides, and a nail bracket for installing the box on a building structure, the brackets including a flat base portion, means securing the base portion to the bottom of the box, the base portion extending in both directions at least as far as diametrically opposite sides of the box, flat wings extending from the base portion normal to the plane thereof in the direction of the box and with the base portion forming a cradle for the box, the wings having terminal portions spaced away from the diametrically opposite sides of the box and each wing comprising a tab folded angularly inwardly toward the box but terminating spaced therefrom and free of obstruction, nail holes in each tab and wing sufficiently aligned for reception of a nail.

8. A combination as defined in claim 7 in which the wings and tabs lie within planes defined by the top and bottom of the box, and the nails holes in the tabs and wings are slightly misaligned and arranged whereby the nails are frictionally retained in the respective tabs and wings pointing obliquely toward each other.

9. A combination as defined in claim 7 in which the junction of tab and wing is adaptable to bending whereby the tab is adapted to be flattened into general parallelism with the remainder of the wing by action of the nail being driven home.